May 23, 1939.  H. A. SMITH  2,159,455
HANDLE CONSTRUCTION FOR SADIRONS AND THE LIKE
Filed Nov. 1, 1937
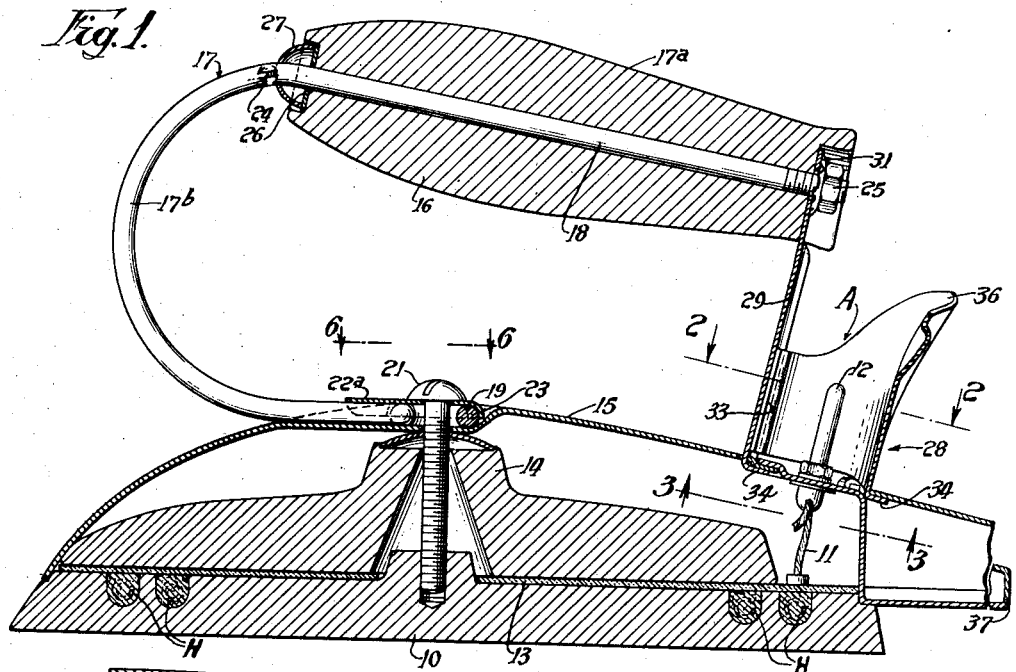
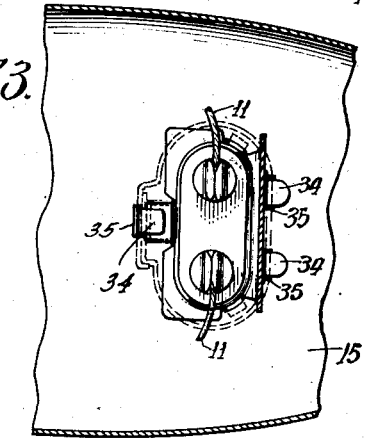
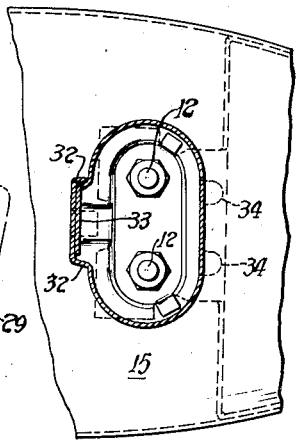
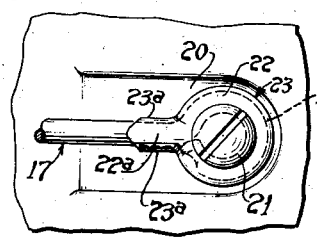
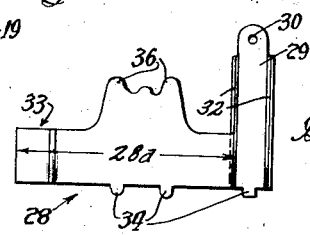
Inventor:
Howard A. Smith,
By: Bair & Freeman
Attorneys Patented May 23, 1939

2,159,455

UNITED STATES PATENT OFFICE 2,159,455

HANDLE CONSTRUCTION FOR SADIRONS AND THE LIKE

Howard A. Smith, St. Louis, Mo., assignor to Knapp-Monarch Company, St. Louis, Mo., a corporation of Missouri Application November 1, 1937, Serial No. 172,186

7 Claims. (Cl. 38—90)

An object of my invention is to provide a handle construction suitable for sad irons and the like which is comparatively simple to manufacture and assemble relative to the sad iron.

A further object is to provide a handle construction which includes a rod extending through the handle proper and having beyond one end of the handle a return bent portion terminating in an eye, means being provided coacting with the eye to secure the rod to the sad iron.

Another object is to provide supporting means for the other end of the handle which includes a combined terminal guard and handle supporting bracket, the handle supporting bracket being secured to the other end of the handle proper as by a nut on the rod.

A further object is to provide a combined handle supporting bracket and terminal guard consisting of a relatively wide sheet of metal having an upward extension at one side, the sheet being formed tubular so that the extension projects from the end of the tube and thus the sheet of metal, after being formed and assembled relative to the sad iron and handle proper, serves both the purpose of a handle supporting element and guard for the electric terminals of the iron.

Still a further object is to provide the combined handle supporting member and terminal guard of such shape that it also serves in conjunction with a heel rest of a sad iron casing to support the iron when in up-ended position.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Figure 1 is a longitudinal sectional view through a sad iron showing my handle construction applied thereto.

Figure 2 is a sectional view on the line 2—2 of Figure 1 showing the shape of the combined handle support and terminal guard.

Figure 3 is a sectional view on line 3—3 of Figure 1 showing the means for connecting the combined handle supporting member and terminal guard to the shell of the sad iron.

Figure 4 is a perspective view of the combined handle supporting member and terminal guard, a part thereof shown in dotted lines being broken away to show coaction of parts of the device with each other.

Figure 5 is a lay-out view of the combined handle supporting member and terminal guard; and Figure 6 is a plan view of the portion of Figure 1 indicated by the line 6—6.

On the accompanying drawing I have used the reference numeral 10 to indicate a sole plate, the usual heating element H being mounted in grooves therein and the terminal wires thereof being indicated at 11. The wires 11 connect with terminal prongs 12. The sad iron includes a cover plate 13 for the heating element H, a weight 14 and a shell 15. The terminal prongs 12 are suitably supported on and insulated from the shell 15.

My handle construction includes a handle proper 16 formed of any suitable heat insulating material, a rod 17 and a combined handle supporting member and terminal guard A. The rod 17 has a portion 17a extending longitudinally through a bore 18 of the handle proper 16. Beyond the front end of the handle proper 16, the rod 17 has a return bend 17b terminating in an eye 19.

The eye 19 is located in a depression 20 formed in the top of the shell 15. A screw 21 extends through the eye and into the sole plate 10 for rigidly securing the eye of the rod 17 to the sad iron. To provide a better seating connection at this point, a clip 22 is used which has a downturned flange 23 extending around the eye 19. The clip 22 also has a forward extension 22a provided with flanges 23a extending on opposite sides of the rod portion 17b.

The rod portion 17a is held rigidly in the handle proper 16 for supporting it by providing shoulder means such as opposite ears 24 pinched into the rod 17 in front of the handle 16 and a nut 25 threaded on the rear end of the rod. So that the ears 24 do not gouge into the handle, a flat washer 26 and a hemispherical washer 27 are preferably provided.

The combined handle supporting member and terminal guard A, as shown in Figure 5, comprises a sheet of metal 28 having a relatively wide portion 28a and an upward extension 29 at one side thereof. The extension 29 is perforated as at 30 to receive the rod portion 17a as shown in Figure 1 whereby the nut 25 retains the extension 29 in connection with the handle proper 16. A spring or lock washer 31 is provided under the nut 25 to prevent loosening thereof during operation of the iron.

The relatively wide portion 28a of the member A is bent to a tubular formation as shown in Figure 4. The extension 29 has side flanges 32 which serve the double purpose of reinforcing the extension and providing a pocket between them for a terminal end 33 of the sheet of metal to be positioned. This is perhaps best shown in Figures 2 and 4. The portion 33 is sprung against the extension 29 between the flanges 32 and is thus retained so that distortion of the tubular terminal guard portion of the member A is eliminated under ordinary operating conditions.

The member A has a plurality of ears 34 extending therefrom which, as shown in Figure 3, project through openings 35 of the shell 15 and are bent over to retain the member A in position. This makes a very simple and satisfactory assembly whereby a single member serves both as a terminal guard and support for one end of the handle.

The member A is also preferably provided with a pair of rest extensions 36. These cooperate with the rear end 37 of the sad iron shell 15 which is usually called the "heel rest", when the iron is up-ended. The heel rest 37 and the extension 36 coact with the ironing board or other supporting surface so as to support the iron up-ended in such position that the sole plate is spaced from the ironing board and consequently cannot damage it.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A sad iron and a handle construction therefor comprising a handle grip portion, a rod extending lengthwise therethrough, said rod extending beyond one end of said handle grip portion, the extending end thereof having a return bend and means for securing the terminal end of said return bend to said sad iron, said means comprising a screw threaded into the sad iron, said terminal end having an eye rigid therewith to receive said screw.

2. In a sad iron and handle construction, a sad iron, a handle grip portion, a rod extending lengthwise therethrough, said rod at one end extending beyond one end thereof and having a return bend, means for securing said return bend to said sad iron, said rod where it leaves said handle grip portion having a raised shoulder engaging the end thereof and a nut on the other end of the rod for retaining said shoulder in engagement with the handle grip portion.

3. In a handle construction, a handle proper, a rod extending lengthwise therethrough, said rod extending beyond one end of said handle proper and having a return bend, means for securing said return bend to a sad iron, said rod where it leaves said handle proper having a raised shoulder engaging the end of the handle proper, a nut on the other end of the rod for retaining said shoulder in engagement with the handle proper, and a supporting bracket having one end connected with the sad iron and its other end connected with the other end of the handle proper by said nut.

4. In a device of the class described, a handle, means for securing one end of said handle to a sad iron, a combined handle supporting bracket and terminal shield connected with the sad iron and with the other end of said handle, said combined handle supporting bracket and terminal shield comprising a sheet of metal having a portion bent into a tubular shape to surround the terminals of the sad iron and having a handle supporting portion extending upwardly from one side of the tubular shaped portion, said handle supporting portion having offset side flanges and said tubular portion having an offset terminal end located between said flanges and secured against displacement thereby.

5. In a sad iron and handle construction, a sad iron, a combination handle bracket and terminal guard comprising a relatively wide sheet of material having an upwardly extending handle supporting portion at one side thereof, said sheet of material being bent to tubular form with said upward extension projecting from one side of the tube, said extension having spaced offset side flanges and said tubular portion having an offset end piece secured between said flanges.

6. In a sad iron and handle construction, a sad iron, a combination handle bracket and terminal guard comprising a relatively wide sheet of material having an upwardly extending handle supporting portion at one side thereof and a rest portion intermediate the sides thereof, said sheet of material being bent to tubular form with said upward extension projecting from one side of the tube and said rest portion projecting from the opposite side of said tube, said upward extension having portions bent out of the plane thereof to give rigidity thereto and said tubular portion having an offset end piece terminating adjacent said upward extension.

7. In a handle construction, a handle, means for supporting one end of said handle on a sad iron and a combined handle supporting bracket and terminal shield connected with the sad iron and with the other end of said handle, said combined handle supporting bracket and terminal shield comprising a sheet of material having a shield portion bent into a tubular shape to surround the terminals of the sad iron, having a rest portion extending upwardly from one side of the tubular shaped portion and having an upward extension constituting a handle support at the other side of the tubular shaped portion, said upward extension having a portion thereof bent out of the plane of the extension to give rigidity to said upward extension.

HOWARD A. SMITH.